United States Patent
Heyn

(10) Patent No.: US 7,048,329 B2
(45) Date of Patent: May 23, 2006

(54) WIND DEFLECTOR WITH ANTI-PINCH PROTECTION

(75) Inventor: Detlef Heyn, Kirchhain (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 10/958,775

(22) Filed: Oct. 5, 2004

(65) Prior Publication Data

US 2005/0073178 A1    Apr. 7, 2005

(30) Foreign Application Priority Data

Oct. 7, 2003    (DE)    ................................ 103 46 524

(51) Int. Cl.
*B60J 7/22*    (2006.01)
(52) U.S. Cl. ..................................... 296/217
(58) Field of Classification Search ................ 296/217
See application file for complete search history.

(56) References Cited

U.S. PATENT DOCUMENTS

| | | | |
|---|---|---|---|
| 4,966,409 A * | 10/1990 | Schmidhuber et al. | 296/213 |
| 5,451,091 A * | 9/1995 | Schleicher | 296/217 |
| 6,030,031 A * | 2/2000 | Martinus Lenkens | 296/217 |
| 6,457,769 B1 * | 10/2002 | Hertel et al. | 296/217 |
| 6,666,503 B1 * | 12/2003 | Sorensen | 296/217 |
| 6,834,914 B1 * | 12/2004 | Bohm et al. | 296/217 |

* cited by examiner

*Primary Examiner*—Dennis H. Pedder
(74) *Attorney, Agent, or Firm*—Carlson, Gaskey & Olds

(57) ABSTRACT

A wind deflector system for a sunroof system includes a wind deflector that is adjustable between a lowered position and an extended position, and a pinch protection element. The wind deflector is adjustable between a lowered and an extended position. The pinch protection element is mounted to the wind deflector and extends downward from the wind deflector as a protection feature to prevent fingers from being pinched.

20 Claims, 4 Drawing Sheets

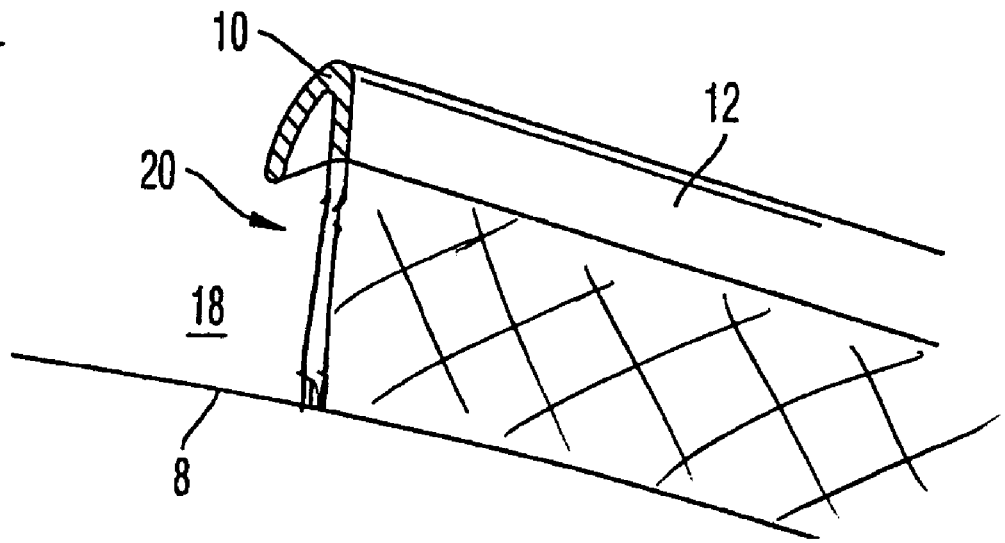

WIND DEFLECTOR WITH ANTI-PINCH PROTECTION

REFERENCE TO RELATED APPLICATION

The application claims priority to German Patent Application No. DE 103 46 524.3 which was filed on Oct. 7, 2003.

BACKGROUND OF THE INVENTION

This invention relates generally to a sunroof system that includes a wind deflector system and to the wind deflector system itself.

A wind deflector system improves airflow conditions when an adjustable panel of a sunroof system is at least in a partially open position. The wind deflection system includes a wind deflector that is usually located at a front edge of a roof opening. The wind deflector is adjustable between a lowered position, in which the wind deflector is located below an outside surface of the vehicle roof, and an extended position, in which the wind deflector protrudes above the outside surface of the vehicle roof. Depending on actuation of the wind deflector, various intermediate positions are possible as well.

When the wind deflector is in the extended position, there is usually a clearance below the wind deflector into which a vehicle occupant can reach. If the wind deflector is then moved to the lowered position, for instance when the sunroof is closed, a risk exists where the vehicle occupant's hand might be pinched by the descending wind deflector.

It is an object an embodiment of the present invention to create a wind deflector system in which the risk of a vehicle occupant getting pinched during operation is eliminated.

SUMMARY OF THE INVENTION

The wind deflector system for a sunroof system according to one embodiment of the present invention comprises a wind deflector that is adjustable between a lowered and an extended position. In one embodiment an additional component, such as a pinch protection element, is mounted to the wind deflector. The pinch protection element is mounted to the wind deflector and extends downwards from the wind deflector. The pinch protection element makes a space below the wind deflector inaccessible (i.e. the space into which the wind deflector is lowered) at least when the wind deflector is moved from the lowered position to the extended position.

In accordance with another embodiment of the present invention, a sunroof system is provided with a wind deflector system that includes a pinch protection element. The pinch protection element extends between the wind deflector and a frame of the sunroof system when the wind deflector is in its extended position, such that a vehicle occupant cannot reach between the extended wind deflector and the roof.

These and other features of the present invention can be best understood from the following specification and drawings, the following of which is a brief description.

BRIEF DESCRIPTION OF THE DRAWINGS

FIG. 7 illustrates another embodiment of the wind deflector system according to the present invention.

DETAILED DESCRIPTION OF THE PREFERRED EMBODIMENT

Figure 1:
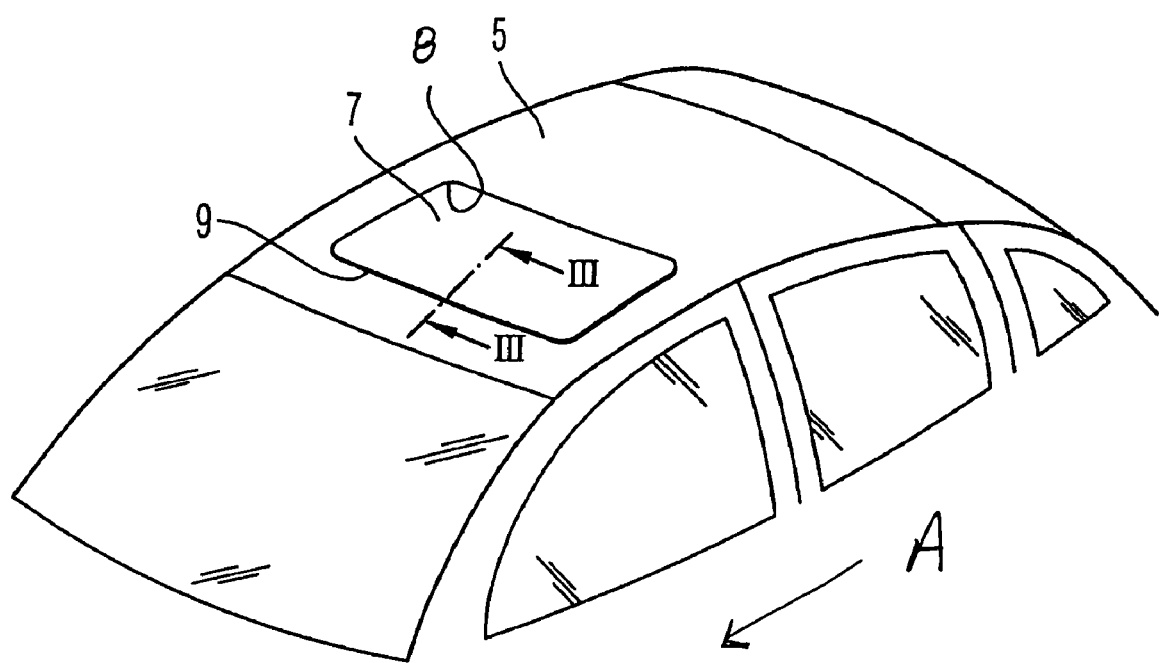
FIG. 1 schematically illustrates a vehicle roof with a sunroof system.

FIG. 1 shows a vehicle roof 5 that includes a sunroof system. The sunroof system includes a panel 7 that is movable relative to a frame 8 in a longitudinal direction of a vehicle. The panel 7 is moveable between a first position, located forward in vehicle A, where the panel 7 closes a roof opening 9 in the vehicle roof 5, and a second position, rearward in the vehicle, where the panel 7 partially or completely clears the roof opening 9. A wind deflector system, not show in FIG. 1, is mounted at a front end of the frame 8 and the roof opening 9.

Figure 2:
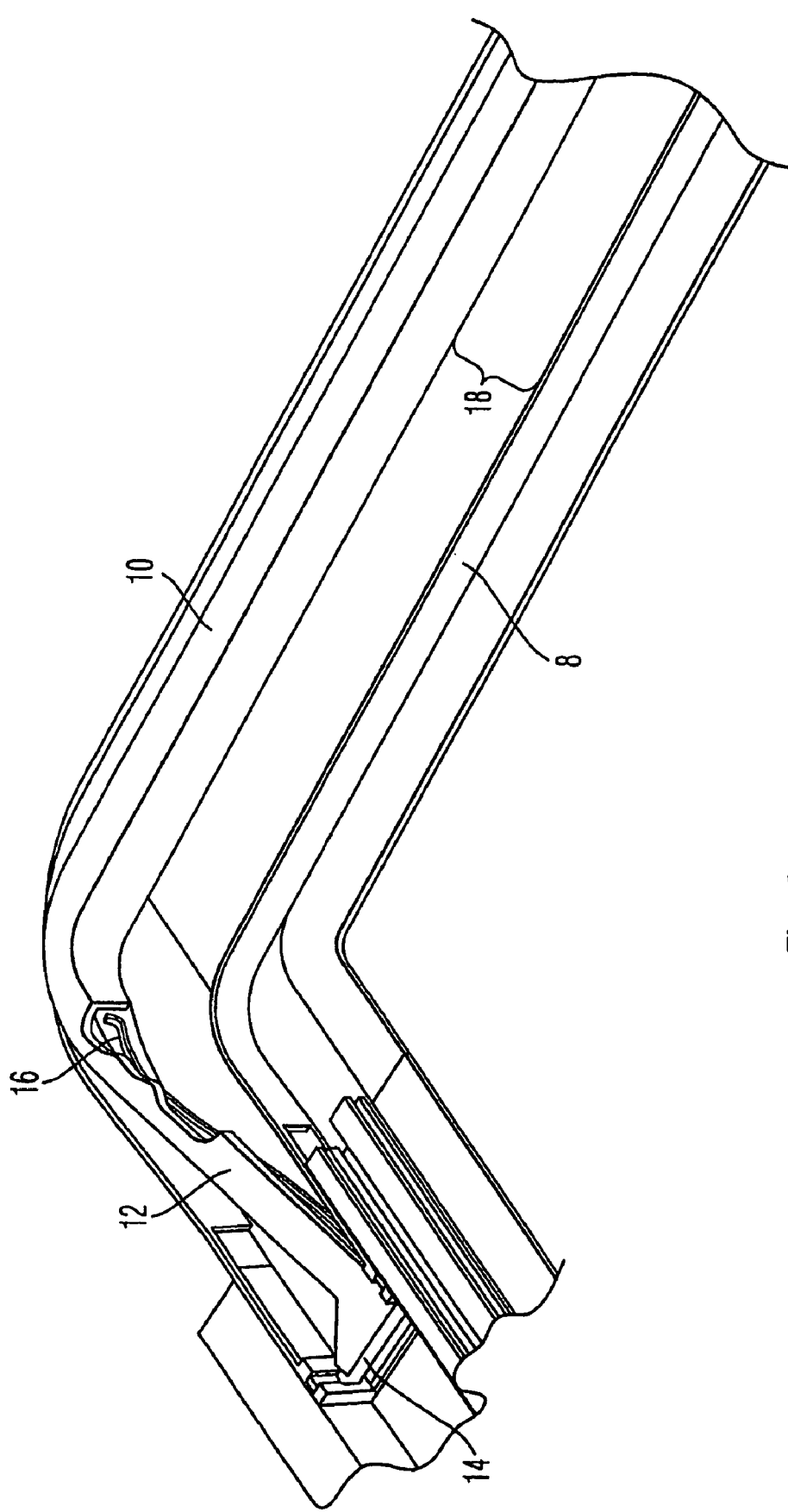
FIG. 2 illustrates a perspective view of a sunroof system in accordance with the prior art.

FIG. 2 illustrates a left side portion of a known wind deflector system along plane III—III as shown in FIG. 1. The complete wind deflector system includes both a left side portion and a right side portion where the right side portion would be mirror-inverted across the plane III—III. The complete wind deflector system includes a wind deflector 10 wherein the wind deflector 10 comprises a U-shaped rigid component including lateral legs 12. The wind deflector 10 is pivotally mounted to the frame 8 at bearing points 14. The wind deflector system includes a pop-out spring 16 that biases the wind deflector 10 into an extended position. In the extended position, a middle portion of the wind deflector 10, located between the lateral legs 12, protrudes beyond an outer skin of the vehicle roof 5. From the extended position, the wind deflector 10 is moveable against the biasing force of the pop-out spring 16 to a lowered position where the wind deflector 10 is located below the outside skin of the vehicle roof 5. Further, the wind deflector 10 is in the lowered position when the panel 7 is almost or completely in a closed position.

In the known wind deflector system illustrated in FIG. 2, when the wind deflector 10 is in the extended position, a clearance 18 exists between the wind deflector 10 and the frame 8, i.e., below the wind deflector 10 and above the frame 8. In this known system, there is a risk that a vehicle occupant may pinch a hand in the clearance 18 when the panel 7 is open or during the process of closing. As known, the wind deflector 10 typically moves to the lowered position as the panel 7 is closing. When the panel 7 is closing, there is a risk of pinching the hand of the vehicle occupant because the wind deflector 10 has, in most cases, already moved into the lowered position and, while the panel 7 is still open to some extent, the vehicle occupant does not yet recognize it as necessary to withdraw his hand from the roof opening. The risk of pinching also exists in electrically actuated wind deflectors that are automatically retracted based upon external parameters and without notice to the vehicle occupant.

Figure 3:
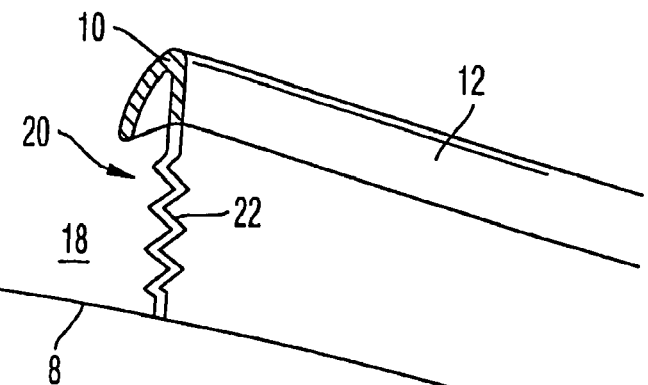
FIG. 3 schematically illustrates a section through a wind deflector system of one embodiment of the present invention along plane III—III of FIG. 1.

To eliminate this risk, a wind deflector system of one embodiment of the present invention includes a pinch protection element 20 (FIG. 3). The pinch protection element 20 is mounted to the wind deflector 10 and extends downward through the clearance 18 where it contacts the frame 8, preventing access to the clearance 18 when the wind deflector 10 is in its extended position. The pinch protection element 20 is mounted not only at the illustrated middle portion of the middle portion of the wind deflector 10, but also at the lateral legs (element 12 in FIG. 2). The pinch protection element 20 extends between the wind deflector 10 and the vehicle frame at these areas. The pinch protection element 20 is designed such that it does not impede movement of the wind deflector 10 from the extended position to the lowered position.

In one embodiment, as illustrated in FIG. 3, the pinch protection element 20 comprises a bellows 22, which collapses in a zigzag manner when the wind deflector 10 is moved from an extended position into a lowered position.

Figure 4:
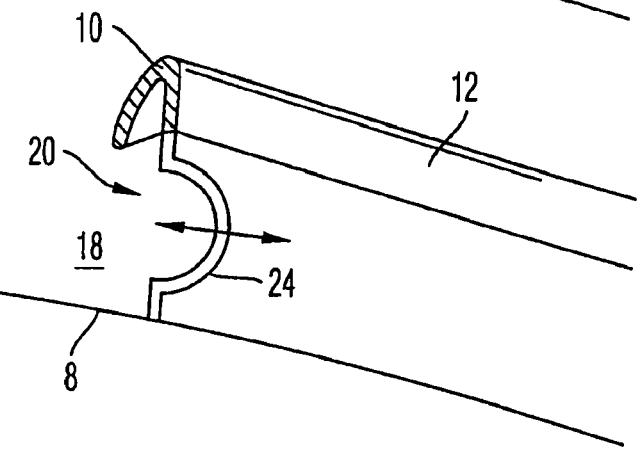
FIG. 4 illustrates another embodiment of the wind deflector system according to the present invention.

In another embodiment, as illustrated in FIG. 4, the pinch protection element 20 comprises a resilient cover, such as a rubber cover which, due to its shape, is biased to contract or collapse away from the clearance 18 when the wind deflector 10 is moved from an extended position to a lowered position. In this way, any object, such as a hand in the area is pushed away from the wind deflector.

Figure 5:
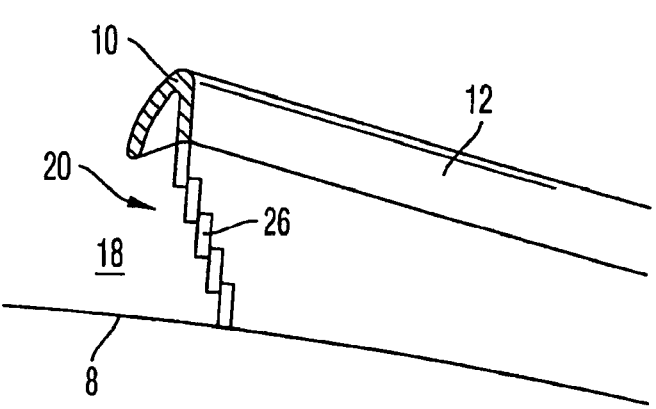
FIG. 5 illustrates yet another embodiment of the wind deflector system according to the present invention.

In yet another embodiment, as illustrated in FIG. 5, the pinch protection element 20 is formed by a plurality of shields 26 movably mounted to each other which, apart from the uppermost and lowermost shields, are each moveably connected at one end with an overlying shield and at the other end with an underlying shield. Therefore, the plurality of shields 26 can be layered together to form a stack when the wind deflector 10 is in a lowered position, where the height of the stack corresponds to the height of a single shield 26.

Figure 6:
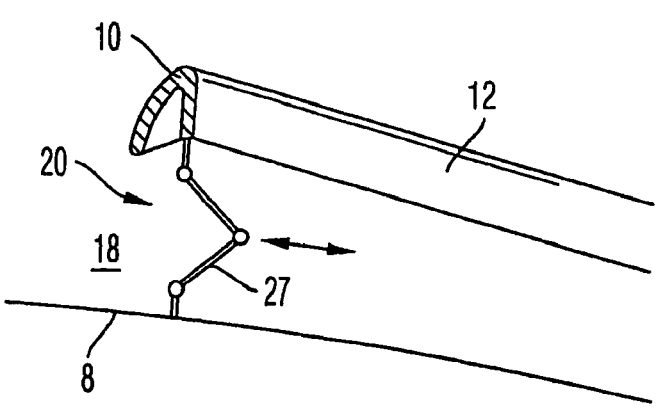
FIG. 6 illustrates a further embodiment of the wind deflector system according to the present invention.

In a further embodiment, as illustrated in FIG. 6, the pinch protection element 20 comprises a plurality of shields 27 wherein the shields 27 are hinged to one another such that they fold inward from a clearance 18 when the wind deflector 10 is moved from an extended position to a lowered position, thereby pushing away a potentially present hand from the wind deflector 10. In sum, all embodiments discussed include an additional component that has little or no wind deflection function and that can be subsequently mounted, with little effort, to an existing wind deflector system to provide reliable anti-pinch protection.

In yet another embodiment, the pinch protection element 20 could be a net (FIG. 7).

Although preferred embodiments of the present invention have been disclosed, a worker of ordinary skill in this art would recognize that certain modifications would come within the scope of this invention. For that reason, the following claims should be studied to determine the true scope and content of this invention.

What is claimed is:

1. A wind deflector system for a sunroof system comprising:
   a wind deflector that is adjustable between a lowered position and an extended position;
   a pinch protection element that is mounted to extend downwardly from the wind deflector to cover a clearance between the wind deflector and a sunroof frame when the wind deflector is an the extended position, the pinch protection element comprising a blocking body that restricts access to the clearance as the wind deflector is moved from the extended position toward the lowered position.

2. The wind deflector system according to claim 1 wherein the blocking body comprises a solid member that is fixed to a bottom edge portion of the wind deflector and extends to contact the sunroof frame.

3. The wind deflector system according to claim 2, wherein the solid member comprises a bellows.

4. The wind deflector system according to claim 2, wherein the solid member comprises a resilient cover.

5. The wind deflector system according to claim 2, wherein the solid member comprises a plurality of shields.

6. The wind deflector system according to claim 5, wherein the plurality of shields are movable relative to each other.

7. The wind deflector system according to claim 5, wherein the plurality of shields are foldable relative to each other.

8. The wind deflector system according to claim 2, wherein the wind deflector is a substantially rigid, generally U-shaped component having a center portion extending in a lateral direction and a pair of legs extending transversely to the center portion and wherein the blocking body is mounted at least to the center portion of the wind deflector.

9. The wind deflector system according to claim 2 wherein the wind deflector includes a forward facing portion and a rearward facing portion extending rearwardly and downwardly from an upper portion of the forward facing portion to a distal end, and wherein the blocking body extends downwardly from the distal end of the rearward facing portion.

10. The wind deflector system according to claim 9 wherein the forward facing portion has a generally curved profile and the rearward facing portion has a generally linear profile.

11. A sunroof system including a wind deflector system, wherein the wind deflector system comprises:
    a wind deflector comprising a substantially rigid, generally U-shaped component having a center portion extending in a lateral direction and a pair or legs extending transversely to the center portion wherein the wind deflector is moveable between a lowered position and an extended position; and
    a pinch protection element that is mounted to extend downwardly from at least the center portion of the wind deflector to cover a clearance between the wind deflector and a frame of the sunroof system when the wind deflector is an the extended position, the pinch protection element comprising a solid blocking body that restricts access to the clearance as the wind deflector is moved from the extended position toward the lowered position.

12. The sunroof system according to claim 11 wherein the solid blocking body is fixed to a bottom edge portion of the wind deflector and extends to contact the frame.

13. The sunroof system according to claim 12, wherein the solid blocking body comprises a bellows.

14. The sunroof system according to claim 12, wherein the solid blocking body comprises a resilient cover.

15. The sunroof system according to claim 12, wherein the solid blocking body comprises a plurality of shields.

16. The sunroof system according to claim 15, wherein the plurality of shields are movable relative to each other.

17. The sunroof system according to claim 15, wherein the plurality of shields are foldable relative to each other.

18. The sunroof system according to claim 11, wherein the wind deflector includes a forward facing portion having a generally curved profile and a rearward facing portion extending rearwardly from the forward facing portion, with the rearward facing portion having a generally linear profile, and wherein the solid blocking body extends downwardly from the rearward facing portion.

19. The wind deflector system according to claim 1 wherein the blocking body comprises one of a plurality of foldable shields, and a resilient cover that is biased to collapse away from the clearance when the wind deflector is moved from the extended position to the lowered position such that the one of the plurality of foldable shields, bellows, and resilient cover pushes an object away from the wind deflector.

20. The wind deflector system according to claim 11 wherein the solid blocking body comprises one of a plurality of foldable shields and a resilient cover that is biased to collapse away from the clearance when the wind deflector is moved from the extended position to the lowered position such that the one of the plurality of foldable shields, the bellows, and the resilient cover pushes an object away from the wind deflector.

* * * * *